(12) United States Patent
Lee et al.

(10) Patent No.: US 9,117,476 B1
(45) Date of Patent: Aug. 25, 2015

(54) MAGNETIC MEDIA ON A PLASTIC SUBSTRATE

(75) Inventors: Jean Ling Lee, San Jose, CA (US); Neil Deeman, Alamo, CA (US); Charles Frederick Brucker, Pleasanton, CA (US); Hong Ying Wang, Fremont, CA (US); Darrin Dwayne Massey, Fremont, CA (US)

(73) Assignee: Seagate Technology, LLC, Cupertino, CA (US)

( * ) Notice: Subject to any disclaimer, the term of this patent is extended or adjusted under 35 U.S.C. 154(b) by 1864 days.

(21) Appl. No.: 10/854,434

(22) Filed: May 27, 2004

(51) Int. Cl.
*G11B 5/706* (2006.01)
*G11B 5/73* (2006.01)

(52) U.S. Cl.
CPC ............ *G11B 5/7305* (2013.01); *G11B 5/7315* (2013.01)

(58) Field of Classification Search
CPC ....................................................... G11B 5/70
USPC ........................................................ 428/847
IPC ....................................................... G11B 5/70
See application file for complete search history.

(56) References Cited

U.S. PATENT DOCUMENTS

| | | | |
|---|---|---|---|
| 5,143,797 A | | 9/1992 | Hashima et al. |
| 5,466,524 A | * | 11/1995 | Hoshi et al. ................... 428/336 |
| 5,567,523 A | | 10/1996 | Rosenblum et al. |
| 5,648,134 A | * | 7/1997 | Shiratori et al. ............. 428/64.1 |
| 5,702,757 A | * | 12/1997 | Ohmura ........................ 427/131 |
| 6,055,140 A | * | 4/2000 | Marchon ....................... 360/135 |
| 6,280,813 B1 | * | 8/2001 | Carey et al. ................... 428/828 |
| 6,537,684 B1 | * | 3/2003 | Doerner et al. ............... 428/611 |
| 6,541,125 B2 | | 4/2003 | Futamoto et al. |
| 6,670,032 B2 | | 12/2003 | Margulies et al. |
| 6,830,824 B2 | * | 12/2004 | Kikitsu et al. ............. 428/828.1 |
| 7,033,685 B2 | * | 4/2006 | Lee et al. ...................... 428/828 |
| 7,036,739 B1 | * | 5/2006 | Mann et al. ................... 235/487 |
| 7,105,239 B2 | * | 9/2006 | Oikawa et al. ............. 428/828.1 |
| 2002/0048257 A1 | * | 4/2002 | Watanabe et al. ............. 369/291 |
| 2005/0074633 A1 | * | 4/2005 | Lee et al. ................... 428/694 T |
| 2005/0094529 A1 | * | 5/2005 | Lee et al. ................... 369/59.12 |
| 2005/0214588 A1 | * | 9/2005 | Iwasaki et al. ................ 428/831 |
| 2006/0083948 A1 | * | 4/2006 | Kawaguchi et al. ....... 428/692.1 |

* cited by examiner

*Primary Examiner* — Gary Harris
(74) *Attorney, Agent, or Firm* — Hall Estill Attorneys at Law

(57) ABSTRACT

A method of adhering a magnetic layer to a plastic substrate of a magnetic recording medium, the method including depositing a SiN-containing layer on the plastic substrate and depositing a magnetic layer on the SiN-containing layer is disclosed. Also disclosed is a disc for a rotating recording system including a plastic substrate, a bilayer including a SiN-containing layer and a metal-containing layer on the plastic substrate, and magnetic media on the bilayer.

15 Claims, 4 Drawing Sheets

| Carbon 30Å |
|---|
| CoPt alloy 100Å (Ar + 0.1% O, 30 mTorr) |
| Ru-2 300Å (Ar, 15 mTorr) |
| Ru-1 100Å (Ar, 5 mTorr) |
| FeCo$_{30.6}$ B$_{12.5}$ 550Å (Ar, 5 mTorr) |
| Cr layer 30Å (Ar, 5 mTorr) |
| Si$_3$N$_4$ XÅ, X= 50 or 200 |
| Polycarbonate substrate |

Figure 4

MAGNETIC MEDIA ON A PLASTIC SUBSTRATE

FIELD OF INVENTION

The invention is directed generally to the field of disc drives, and more particularly to a plastic disc substrate having an adhered magnetic media for magnetic recording.

BACKGROUND

Magnetic discs and disc drives are employed for storing data in magnetizable form. Preferably, one or more discs are rotated on a central axis in combination with data transducing heads positioned in close proximity to the recording surfaces of the discs and moved generally radially with respect thereto. Magnetic discs are usually housed in a magnetic disc unit in a stationary state with a magnetic head having a specific load flying over the surface of the disc. Data are written onto and read from a rapidly rotating recording disc by means of a magnetic head transducer assembly that flies closely over the surface of the rotating disc. Preferably, each face of each disc will have its own independent head. The transducer assembly must be held very closely spaced from the rotating disc surface as a condition of achieving high information storage density.

FIG. 1 is an exploded perspective view of a disc drive storage system in which the present disc would be useful. Clearly, the disc is not limited to use in such disc drives. In fact, although a magnetic disc drive is shown, the disc could equally well be used in a magneto-optical disc drive. In fact, plastic disc substrates would probably be especially useful in removable storage applications, such as CD-ROM or magneto-optical drives. Thus, FIG. 1 is provided primarily to give an illustrative example of the environment in which a rotating hard storage disc is used.

In this particular example of FIG. 1, the storage system 10 includes a housing base 12 having a spindle motor 14 which rotatably carries the storage discs 16 which are to be discussed in detail below. An armature assembly 18 moves transducers 20 across the surface of the discs 16. The environment of disc 16 is sealed by seal 22 and cover 24. In operation, discs 16 rotate at high speed while transducers 20 are positioned at any one of a set of radially differentiated tracks on the surface of the disc 16. This allows the transducers 20 to read and write encoded information on the surface of the discs at selected locations. The discs rotate at very high speed, several thousand RPM, in order to maintain each transducer flying over the surface of the associated disc. In present day technology, the spacing distance between the transducer and the rotating disc surface is measured in micro inches; thus it is absolutely essential that the disc does not vibrate while it is being rotated, as such vibration could easily disturb the air flow which is maintaining the flight of the transducer over the surface, or simply cause mechanical contact between the transducer and the disc surface. Such contact would probably damage the disc surface, resulting in the loss of disc storage space; it could even damage the transducer, resulting in loss of use of the disc drive.

A disc recording medium is shown in FIG. 2. Even though FIG. 2 shows sequential layers of magnetic media on one side of the non-magnetic substrate 2-20, it could be sputter deposited sequential layers on both sides of the non-magnetic substrate.

Adverting to FIG. 2, an adhesive sub-seed layer 2-21 is deposited on substrate 2-20, e.g., a glass or glass-ceramic, Al or AlMg substrate. Subsequently, a seed layer 2-22 is deposited on the sub-seed layer 2-21. Then, an underlayer 2-23, is sputter deposited on the seed layer 2-22. An intermediate or flash layer 2-24 is then sputter deposited on underlayer 2-23. Magnetic layer 2-25 is then sputter deposited on the intermediate layer, e.g., CoCrPtTa. A protective covering overcoat 2-26 is then sputter deposited on the magnetic layer 2-25. A lubricant topcoat (not shown in FIG. 2 for illustrative convenience) is deposited on the protective covering overcoat 2-26.

The disc is finely balanced and finished to microscopic tolerance. Take the smoothness of its surface, for example. The drive head rides a cushion of air at microscopic distances above the surface of the disc. So, the surface cannot be too smooth, or the drive head will end up sticking to the disc, and it cannot be too rough either, or the head will end up getting caught in the microscopic bumps on the surface.

It is considered desirable during reading and recording operations to maintain each transducer head as close to its associated recording surface as possible, i.e., to minimize the flying height of the head. This objective becomes particularly significant as the areal recording density and drive speed increase. The areal density (Gbits/in$^2$) is the recording density per unit area and is equal to the track density (TPI) in terms of tracks per inch times the linear density (BPI) in terms of bits per inch.

As areal density and drive speed increase, excessive surface roughness of the substrate (at a microscopic level) can cause head crash due to accidental glide hits of the head and media. To minimize head crash due to accidental glide hits, conventional techniques of manufacturing magnetic recording media produce a smooth surface on the disc by polishing the substrate prior to sputter and tape burnishing (buffing) and tape wiping the media. See, for example, U.S. Ser. No. 10/662,426, Nakamura et al., U.S. Pat. No. 5,202,810 and Bornhorst et al., U.S. Pat. No. 4,430,782. Typically, the substrate polishing is done using slurry and buffing/wiping is done after sputtering. However, these conventional techniques are attendant with numerous disadvantages for plastic substrate media. For example, a lack of strong adhesion of the plastic substrate and magnetic media, including the magnetic layer(s), could cause a separation of magnetic media from the substrate during buffing or wiping.

To avoid glide hits, a smooth defect-free surface in the data zone is desired. The direct result of these demands is tending towards low yield due to less defect tolerance at the surface of the media. Thus, it is desired to provide an improved adhesion between the plastic substrate and magnetic media deposited thereon to allow for burnishing/polishing the surface of the media having plastic disc substrates to produce defect-free surfaces.

SUMMARY OF THE INVENTION

This invention relates to a disc for a rotating recording system comprising a plastic substrate, a bilayer comprising a SiN-containing layer and a metal-containing layer on the plastic substrate, and a magnetic layer on the bilayer. The bilayer preferably provides substantial adhesion between the plastic substrate and the magnetic layer such that the magnetic layer is not substantially delaminated during a buffing/burnishing or wiping operation of the disc. The substrate preferably contains an insert molded therein. The insert preferably comprises a central circle, a plurality of radiating fingers and a plurality of circumferentially extending members connecting said fingers at sites radially spaced from said center circle. The plastic substrate is preferably a polycarbonate-containing substrate. A surface of the plastic substrate is preferably etched by plasma. The metal-containing layer preferably comprises Cr or Ti. The disc preferably further comprises a FeCoB layer and a Ru layer between the bilayer and the magnetic layer. Preferably, the SiN-containing layer has a thickness in a range of 5 Å to 1000 Å and the metal-containing layer has a thickness in a range of 5 Å to 5000 Å. More preferably, the SiN-containing layer has a thickness in a range of 5 Å to 500 Å.

Another embodiment is a method for adhering a magnetic layer to a plastic substrate of a magnetic recording medium, the method comprising depositing a SiN-containing layer on the plastic substrate and depositing a magnetic layer on the SiN-containing layer. The method could further comprise depositing a metal-containing layer on the SiN-containing layer to form a bilayer, wherein the bilayer provides substantial adhesion between the plastic substrate and the magnetic layer such that the magnetic layer is not substantially delaminated during a buffing/burnishing or wiping operation of the disc. There could be a FeCoB layer and a Ru layer between the bilayer and the magnetic layer. In one variation, the magnetic recording medium is a tape.

Additional advantages of this invention will become readily apparent to those skilled in this art from the following detailed description, wherein only the preferred embodiments of this invention are shown and described, simply by way of illustration of the best mode contemplated for carrying out this invention. As will be realized, this invention is capable of other and different embodiments, and its details are capable of modifications in various obvious respects, all without departing from this invention. Accordingly, the drawings and description are to be regarded as illustrative in nature and not as restrictive.

BRIEF DESCRIPTION OF THE DRAWINGS

FIG. 4 shows a schematic diagram showing cross section of an embodiment of a preferred disc with Si—N adhesion layer sputtered on plastic substrate. The layer structure and thicknesses are exemplary and not limiting the scope of this invention.

DETAILED DESCRIPTION

Figure 1:
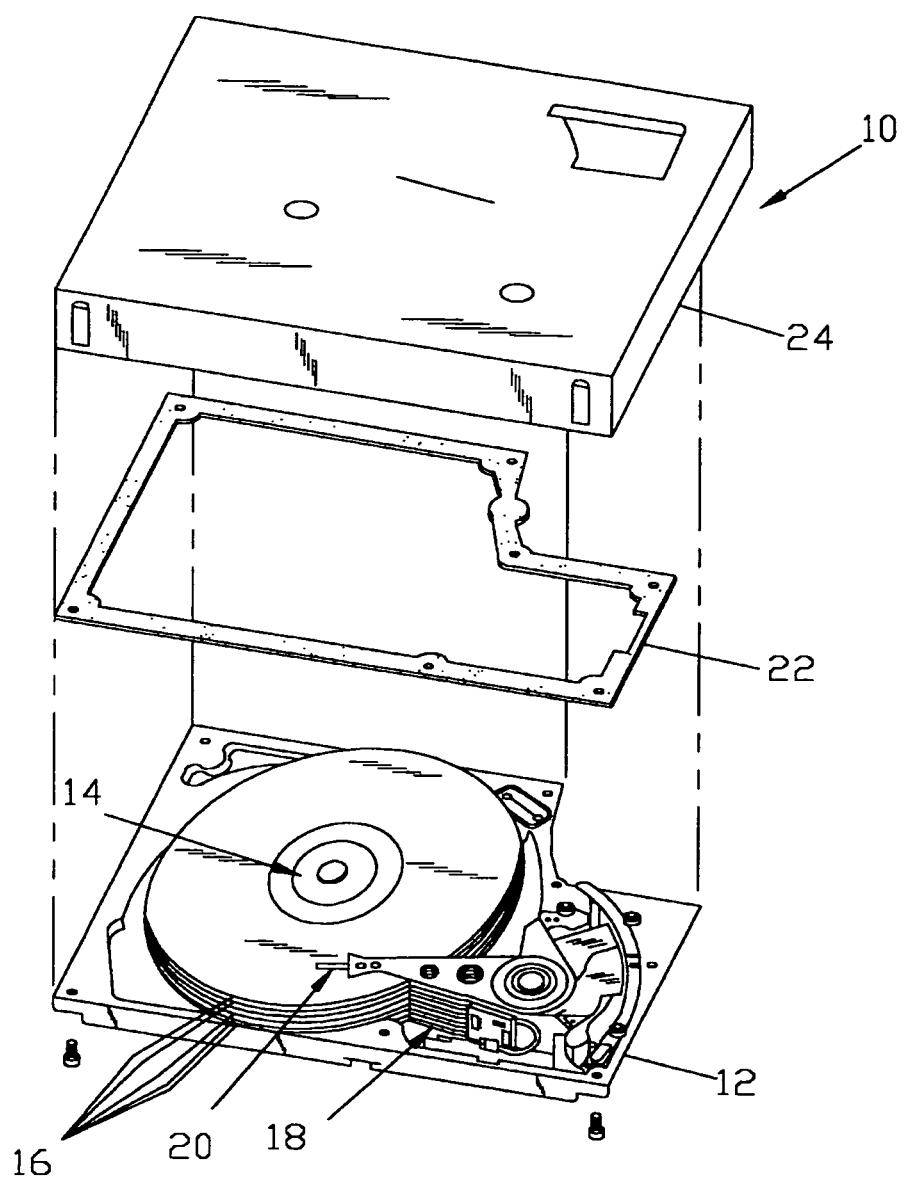
FIG. 1 is an exploded perspective view of a disc drive in which the present invention may be useful.
Figure 2:
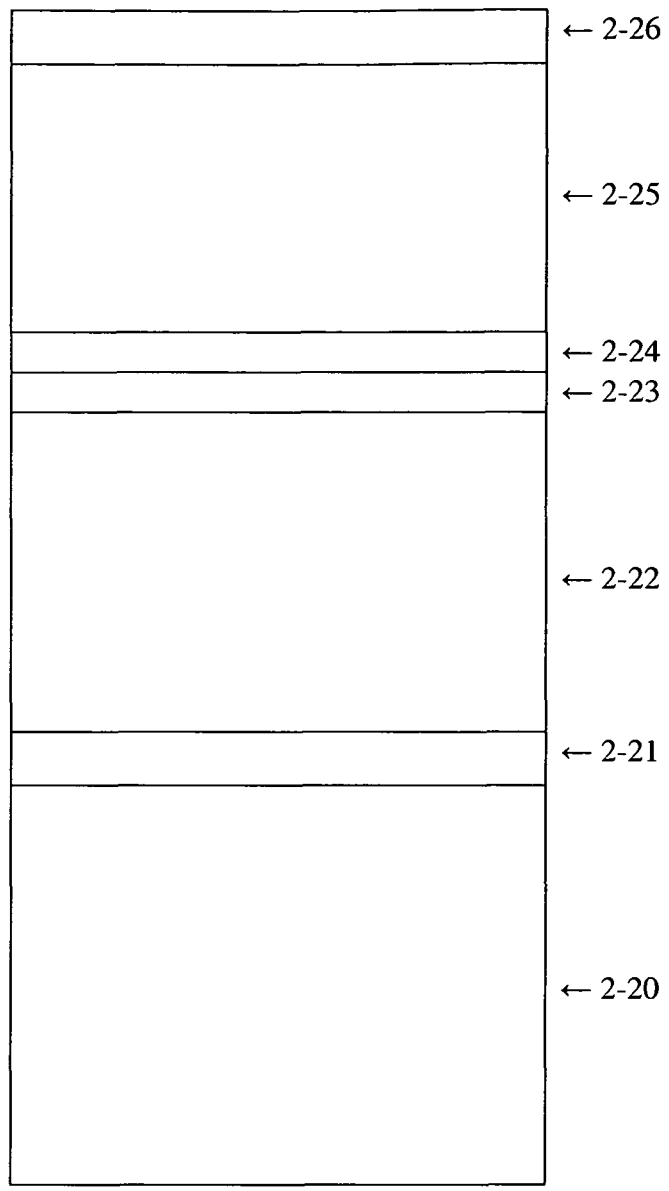
FIG. 2 schematically shows a film structure of a magnetic recording medium.

This invention relates to magnetic media on plastic substrates. The invention also relates to a method of achieving strong adhesion of magnetic media on a plastic disc substrate. A method of manufacturing a disc of this invention is provided below primarily to give an illustrative example of the manufacturing environment under which a disc of this invention could be made.

Almost all the manufacturing of the discs for magnetic recording media would take place in clean rooms, where the amount of particulates and contaminants in the atmosphere is kept very low, and is controlled and monitored. The disc substrates would be handled in a manner that prevents contamination and damage to the substrate. The substrates would preferably be transferred to process cassettes to be moved from one process to another. Preferably, the cassettes would be moved from one room to another on automatic guided vehicles to prevent contamination due to human contact.

Typically, a molded plastic substrate would have an ultra-clean surface and would be ready for the deposition of layers of magnetic media on the substrate. Preferably, the deposition is done by sputtering.

Sputtering is perhaps the most important step in the whole process of creating recording media. There are two types of sputtering: pass-by sputtering and static sputtering. In pass-by sputtering, multiple discs are simultaneously passed inside a vacuum chamber, where they are bombarded with the magnetic and non-magnetic materials that are deposited as one or more layers on the substrate. Static sputtering uses smaller machines, and each disc is picked up and sputtered individually. Both pass-by and static sputtering methods can be applicable to the deposition of magnetic media on plastic substrates.

The sputtering layers can be deposited in what are called bombs, which are loaded onto the sputtering machine. The bombs are vacuum chambers with targets on either side. The substrate could be lifted into the bomb and bombarded with the sputtered material.

Sputtering could lead to some asperity formation on the substrate. These asperities should be removed to prevent scratches on the head and substrate, such as by subsequent buffing.

A lube is preferably applied to the substrate surface as one of the top layers of the media. Once a lube is applied, the substrates would move to the tape burnishing and tape wiping stage, where the substrate could be buffed while it preferentially spins around a spindle. After buffing/burnishing, the substrate could be wiped.

Subsequently, the disc could be prepared and tested for quality through a three-stage process. First, a burnishing head passes over the surface, removing any asperities. The glide head then goes over the disc, checking for remaining asperities, if any. Finally the certifying head checks the surface for manufacturing defects and also measures the magnetic recording ability of the substrate.

In one embodiment of this invention, a silicon-nitrogen alloy sputtered onto polycarbonate disc substrates was found to improve adhesion of magnetic media (preferably, granular perpendicular magnetic media) to the substrate, as determined by tape pull tests using a modified ASTM 3359 standard with ¾" wide Scotch type 600 tape testing adhesion layers on a plastic substrate. A bilayer of ~20 Å or thicker Si—N, preferably ~40 Å or thicker Si—N, more preferably ~60 Å or thicker Si—N and ~20 Å or thicker Cr, preferably ~40 Å or thicker Cr, more preferably ~60 Å or thicker Cr seems especially effective in improving magnetic media adhesion on molded polycarbonate substrates. However, other metal layers such as Ti or $CrW_{10}$ may also be used.

In preparing the polycarbonate substrates for sputtering, it is preferable to minimize water absorption by the substrates by either sputtering the substrates immediately after molding or by keeping the substrates in desiccators with flowing dry nitrogen after they are molded until just before they are sputtered. A plasma treatment of the substrate to chemically activate the surface is optional. Plasmas such as Ar, $N_2$, Ar 50%/$H_2$ 50%, $O_2$, or $H_2$ may be used.

Figure 3:
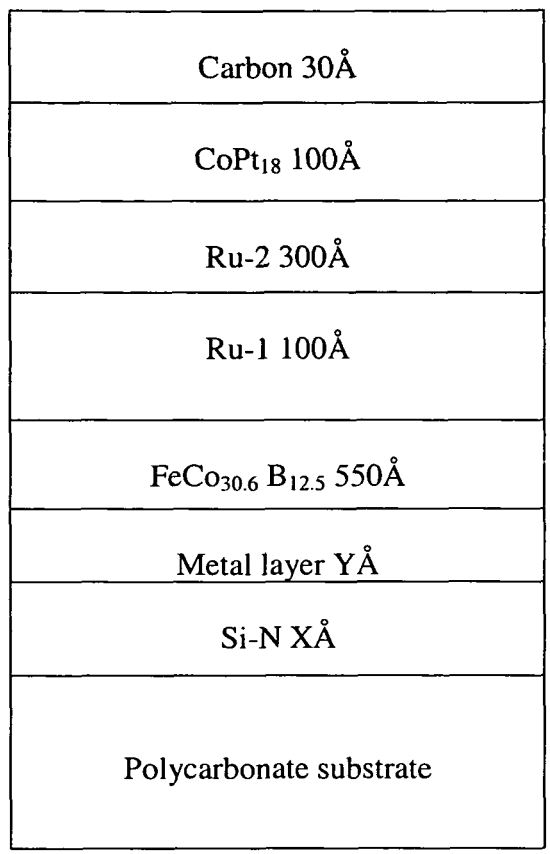
FIG. 3 shows a schematic diagram showing cross section of an embodiment of magnetic media with Si—N adhesion layer sputtered on plastic substrate. The layer structure and thicknesses are exemplary and not limiting the scope of this invention.

FIG. 3 shows a schematic diagram showing cross section of one embodiment of magnetic media, preferably granular perpendicular media, with Si—N adhesion layer sputtered on plastic substrate. The thicknesses of the layers are exemplary to give an illustrative example and do not specifically limit the scope of this invention. In the above embodiment, Si—N layer of thickness X angstrom (where X is the range of about 30 Å to about 200 Å) is sputter deposited on a polycarbonate substrate whose surface has optionally been washed, textured and/or polished. A metal layer, preferably a Cr layer, of thickness Y angstrom (where Y is in the range of about 30 Å to about 100 Å) is sputter deposited on the Si—N layer. Subsequently, a magnetically soft underlayer of FeCoB, an orienting layer of Ru-1, an exchange decoupling layer of Ru-2, a magnetic layer containing Co and Pt, and a protective carbon are deposited on the metal layer.

The media of FIG. 3 not only had good adhesion between the plastic substrate and magnetic media, but also showed good magnetic characteristics. Table I shows Kerr loop data showing the magnetic characteristics of the media shown in FIG. 3 where the Si—N thickness is 60 Å and the metal layer is 70 Å of Cr.

TABLE I

| Adhesion layer/<br>Metal layer | Hc (Oe) | Hn (Oe) | S | S* |
|---|---|---|---|---|
| Si-N 60Å/Cr 70Å | 5765 | 2839 | 0.975 | 0.505 |

In this invention, silicon nitride was selected for both its ability to adhere well to polycarbonate and for its non-magnetic properties. Also, in this invention silicon nitride is preferably used as an adhesion layer, not as a component of the substrate. In an embodiment of this invention, a silicon nitride layer could be used as an adhesion layer with subsequent metal layers on the silicon nitride layer. Other nitrides such as titanium nitride and aluminum nitride may also be used as an adhesion layer for adhering magnetic media to plastic substrates.

In light of the above experiments, the inventors found that an example of a preferred embodiment of a plastic substrate magnetic medium is as that shown in FIG. 4. The terms within the parenthesis in FIG. 4 refer to sputter conditions for depositing the layers of magnetic media of FIG. 4. However, the above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention.

For example, one embodiment of this invention could be an injection molded plastic disc substrate incorporating a stiff insert made of a very stiff material (metal, ceramic, composite, silicon, etc.) embedded in the plastic matrix as disclosed in U.S. Pat. No. 6,055,140. Preferably, the insert has a circular center region and radially extending fingers. Additional features of the web may include one or more connecting regions extending between the fingers. In this way, both vibration and flutter in the circumferential or radial direction could be suppressed by the insert.

Other embodiments could by any combinations of the above embodiments. Thus, this invention is not intended to be limited to the embodiments shown, but is to be accorded the widest scope consistent with the principles and features disclosed herein. Finally, the entire disclosure of the patents and publications referred in this application are hereby incorporated herein by reference.

The invention claimed is:

1. A disc drive data storage system, comprising:
a base joined with a cover defining a housing;
a motor supported by at least one of the base and the cover inside the housing;
a data transfer member supported by at least one of the base and the cover inside the housing;
a data storage disc affixed to the motor to operably rotate the disc in a data transfer relationship with the data transfer member, the data storage disc comprising:
a plastic substrate;
a bilayer on the plastic substrate, wherein the bilayer consists of:
a non-magnetic first layer in contact with the plastic substrate, wherein the first layer is selected from the group consisting of silicon nitride, titanium nitride and aluminum nitride;
a second layer in contact with the first layer of the bilayer, wherein the second layer is selected from the group consisting of elemental Cr, elemental Ti and $CrW_{10}$; and
a first magnetic layer, an exchange decoupling layer, and a second magnetic layer on the bilayer, the exchange decoupling layer located between the first and second magnetic layers and having a thickness of 10 nm or more.

2. The disc of claim 1, wherein the bilayer provides adhesion between the plastic substrate and the magnetic layer such that the magnetic layer is not delaminated during a buffering/burnishing or wiping operation of the disc.

3. The disc of claim 1, wherein the substrate contains an insert molded therein.

4. The disc of claim 3, wherein the insert comprises a central circle, a plurality of radiating fingers and a plurality of circumferentially extending members connecting said fingers at sites radially spaced from said center circle.

5. The disc of claim 1, wherein the plastic substrate comprises a polycarbonate.

6. The disc of claim 1, wherein the first magnetic layer comprises a FeCoB-containing layer and the exchange decoupling layer comprises a Ru-containing layer.

7. The disc of claim 1, wherein the first layer in the bilayer has a thickness in a range of 5 Å to 100 Å and the metal-containing layer has a thickness in a range of 5 Å to 5000 Å.

8. A magnetic recording medium comprising:
a plastic substrate comprising a polycarbonate, wherein the plastic substrate comprises a plasma-etched surface,
a bilayer on the plastic substrate, wherein the bilayer consists of:
a SiN-containing layer in contact with the plasma-etched surface of the substrate, wherein the SiN-containing layer consists of SiN, and
a metal-containing layer in contact with the SiN-containing layer, wherein the metal-containing layer is elemental Cr, and
a first magnetic layer, an exchange decoupling layer, and a second magnetic layer on the bilayer,
wherein the SiN-containing layer is non-magnetic, wherein the exchange decoupling layer is located between the first and second magnetic layers and has a thickness of 10 nm or more.

9. The medium of claim 8, wherein the bilayer provides adhesion between the substrate and the magnetic layer such that the magnetic layer is not delaminated during a buffering/burnishing or wiping operation of the medium.

10. The medium of claim 8, wherein the substrate contains an insert molded therein.

11. The medium of claim 10, wherein the insert comprises a central circle, a plurality of radiating fingers and a plurality of circumferentially extending members connecting said fingers at sites radially spaced from said center circle.

12. The medium of claim 8, wherein the first magnetic layer comprises a FeCoB-containing layer and the decoupling layer comprises a Ru-containing layer.

13. The medium of claim 8, wherein the SiN-containing layer has thickness in a range of 5 Å to 1000 Å and the metal-containing layer has thickness in a range of 5 Å to 5000 Å.

14. The disc of claim 1, wherein the thickness of the decoupling layer is in the range of 10 to 40 nm.

15. The medium of claim 8, wherein the thickness of the decoupling layer is in the range of 10 to 40 nm and the medium comprises a granular perpendicular magnetic medium.

* * * * *